UNITED STATES PATENT OFFICE.

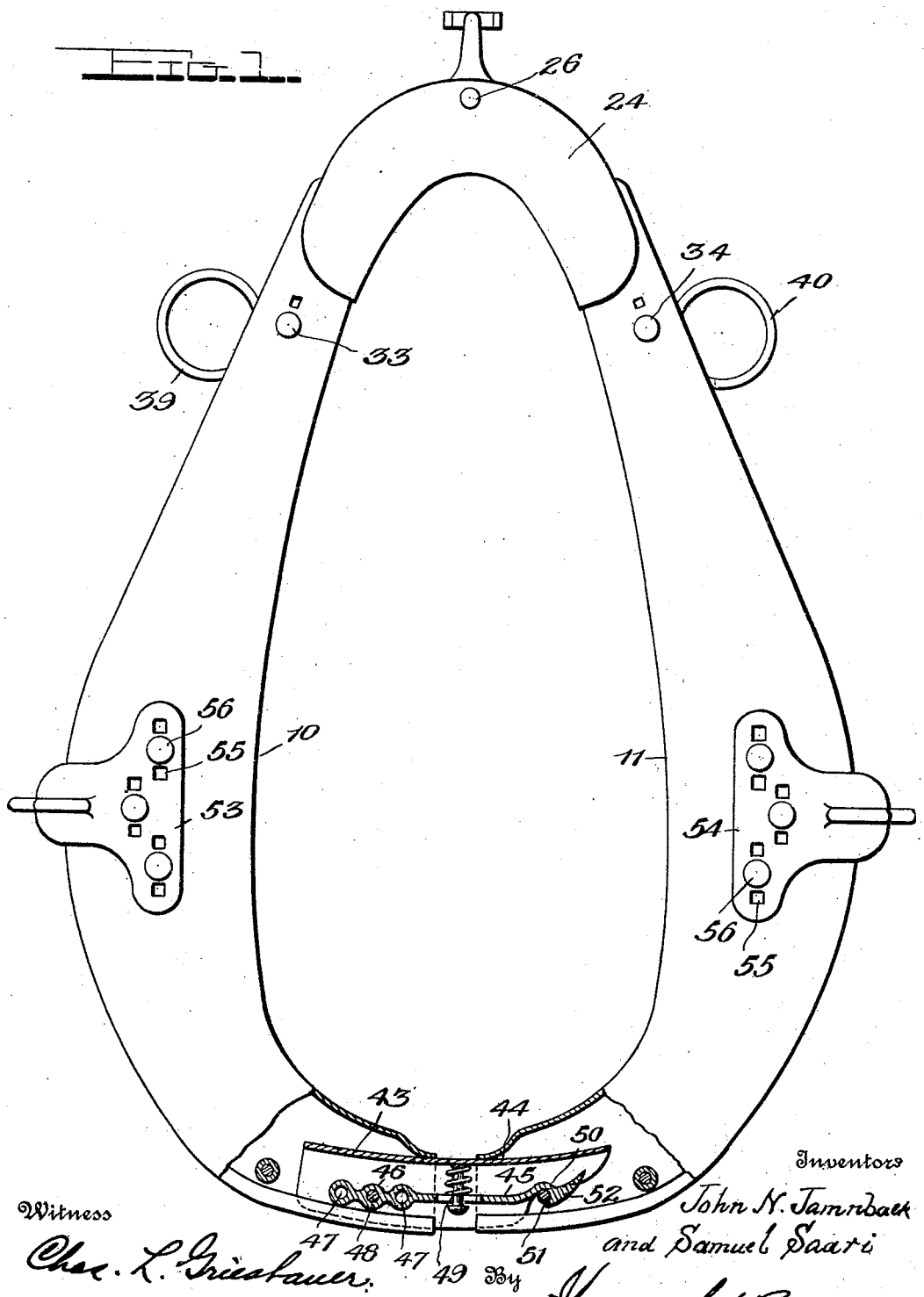

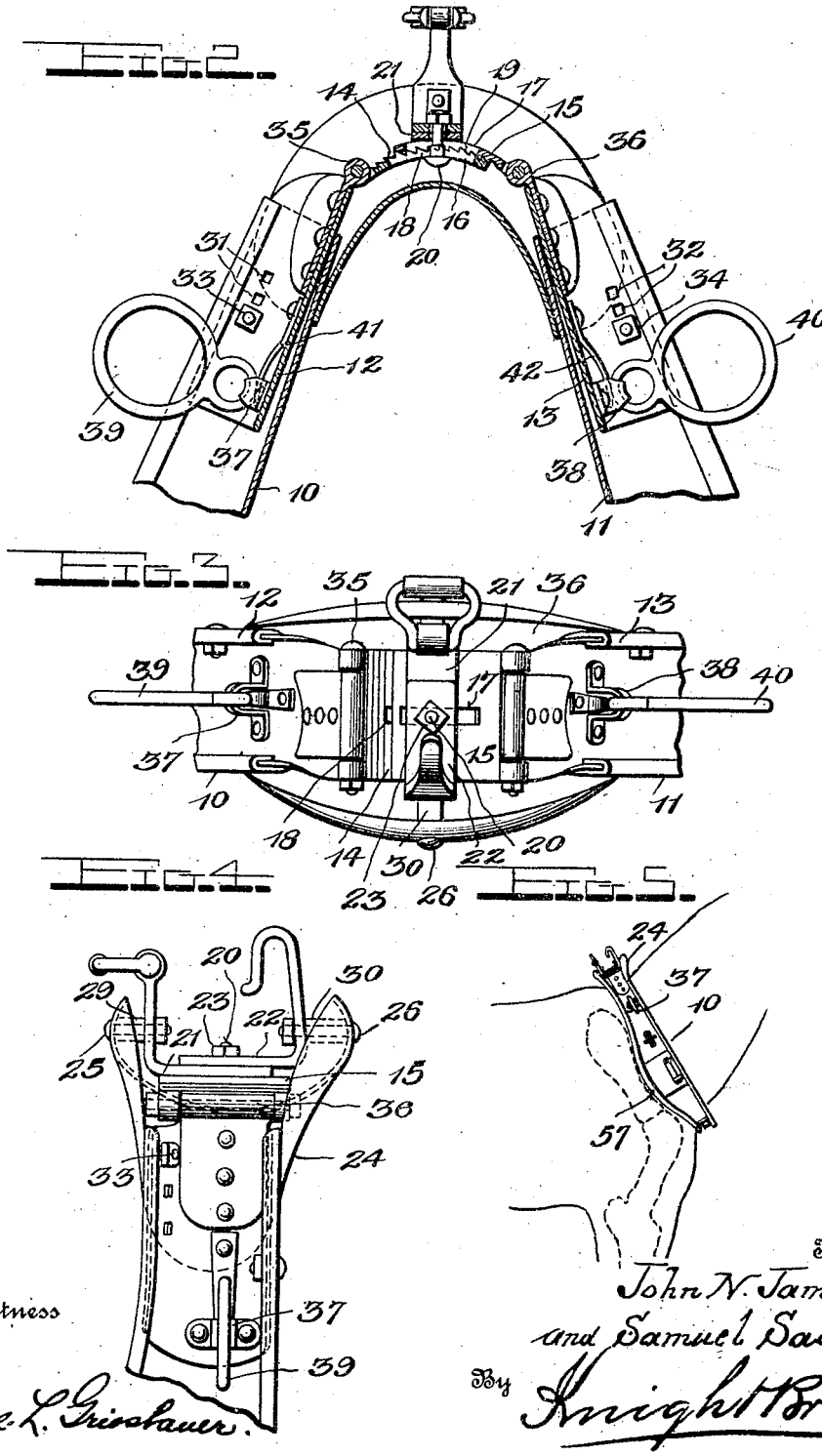

JOHN N. JAMNBACK AND SAMUEL SAARI, OF FITCHBURG, MASSACHUSETTS, ASSIGNORS TO UNITED STATES HORSE COLLAR CO., OF FITCHBURG, MASSACHUSETTS, A COPARTNERSHIP CONSISTING OF SAMUEL A. SAARI, JOHN JAMNBACK, AND JOHN NYLUND.

METAL HORSE-COLLAR.

1,234,902.     Specification of Letters Patent.     Patented July 31, 1917.

Application filed January 26, 1917. Serial No. 144,745.

*To all whom it may concern:*

Be it known that we, JOHN N. JAMNBACK and SAMUEL SAARI, citizens of the United States, residing at Fitchburg, in the county of Worcester and State of Massachusetts, have invented certain new and useful Improvements in Metal Horse-Collars, of which the following is a specification.

This invention relates to metal horse collars, and particularly to those made of steel.

One of the objects of the invention is to provide means for adjusting the collar in various particulars to fit different sized necks.

Another object of the invention is to so construct the parts of the collar that they can readily be taken apart for inspection or repair.

It is also the purpose of this invention to minimize the pressure of the collar against the shoulder-blade and to so construct the collar that the major part of the pressure will be borne by the muscles of the neck instead of upon the scapula, and thereby increase the period of usefulness of the horse by reducing the liability of lameness to which horses are subjected under the present system after a relatively short period of usefulness.

In carrying out our invention, means is provided whereby the side members of the collar may be conveniently adjusted longitudinally and laterally, lateral adjustments being provided at the respective ends of the collar so that the neck space at the upper portion of the collar may be made relatively wide, while the lower part is relatively narrow or vice versa. The longitudinal adjustment of the side members of the collar is effective in permitting the bulging or bearing portion of the collar to be positioned so that the convex portion of each side member will be received in the concave portions of the scapula bones of the animal, so that rubbing will be prevented and the pressure will be applied on the draft animal at the point best adapted to receive it.

In the drawings:—

Figure 1 is a view partly in plan and partly in section of a horse collar constructed in accordance with our invention;

Fig. 2 is a fragmentary section view through the upper end of the collar;

Fig. 3 is a fragmentary top plan view of the collar;

Fig. 4 is a fragmentary side view of the collar;

Fig. 5 is a fragmentary view of a horse showing the finished collar in place.

Referring now to the drawings, 10 and 11 designate the two side members of the collar, each consisting of a substantially arcuate side member of substantially U-form in cross-section, and each having an adjustable extension 12 and 13 respectively which is hinged to one of the overlapping connecting members 14 and 15. The members 14 and 15 are provided with elongated slots 16 and 17 respectively, and with interengaging ribs or teeth 18 and 19, so that when said members 14 and 15 are connected together, the adjustment of the upper ends of the members 10 and 11 will have been completed. Projecting through the slots 16 and 17 is a headed bolt 20 having a squared portion engaging the slot 16, the shank of the bolt extending through the back-strap holder 21 and the check rein hook 22, the end of said bolt receiving a nut 23 to secure the plates, back-strap holder and check rein hook in place.

In order to protect the upper portion of the neck of the animal we provide a concave metal neck pad 24 which fits between the members 10 and 11 and which is fastened to the back-strap holder and to the check rein hook respectively by the fastening devices 25 and 26, here shown as bolts with spacing sleeves 29 and 30.

Inasmuch as the extensions 12 and 13 carried by the side members 10 and 11 are provided with a plurality of openings 31 and 32, corresponding with an opening in each of the side members, to receive the fastening devices 33 and 34 respectively, it follows that the extensions may be projected beyond the ends of the side members when occasion requires, by simply taking out the fastening devices, consisting of the bolts and nuts 33 and 34, and after the required adjustment is made, applying the fastening devices as shown in Figs. 2 and 4. Inasmuch as the overlapping plates 14 and 15 are supported by the hinged joints 35 and 36, and inasmuch as the back strap holder and check rein hook are carried by the plates, and these in turn carry the pad, it will follow that the pad may be adjusted vertically without disturbing any of the complemental parts, except affecting adjustment of the extensions. Of course, if it is desired to adjust the upper ends of the members 10 and 11 in a lateral direction, the nut 23 will be loosened so that the bolt 20 will permit the overlapping plates to become disengaged for the purpose of adjustment, whereupon the bolt 20 and nut 23 may again be tightened and the adjustment made secure. The extensions 12 and 13 are also provided with loops 37 and 38 which receive the rein guiding rings 39 and 40, and these rings are frictionally held in outward position by means of the flat or leaf springs 41 and 42, each having one end connected to an extension and the other, free end, within one of the loops to bear against a latch ring.

One of the side members 10 is provided with a latch guard 43 which is adapted to extend through the open end 44 of the side member 11 and within the guard is a latch or detent 45 adjustable across the collar by means of the end 46 which is provided with a plurality of transverse openings 47 to receive a bolt 48 which passes through the collar and one of the openings 47. The detent is spring pressed through the medium of a spring 49, one end of which bears against the guard 43 and the other end against the detent, so that the normal tendency will be to have the hooked end 50 of the detent engage the pin 51. As the end 52 of the hook 50 is curved, the fastening may be snapped in place by simply bringing the two lower ends of the collar together, but in order to unlatch the lower ends of the collar, pressure will have to be applied to the hook in opposition to the spring 49. The tug fastenings 53 and 54 on the front sides of the respective side members 10 and 11 are also made vertically adjustable through the medium of the rows of openings 55 and the removable fastening devices 56. The portions 57 on the inside of the side members 10 and 11 are bulged or convex to partake of the form of the concave curvature of the scapula of the draft animal, so that the bulge will fit in the recessed portion of the bone against the muscles of the neck and not bear against the bone to cause soreness. In order to insure the proper position of the bulged portions of the side members with respect to the particular animal on which the collar is to be placed, the extensions may be adjusted longitudinally with respect to the side members until the bulge in each side member has its proper relative position with respect to the scapula of the particular animal on which the collar is to be placed, whereupon the adjustment may become fixed. It will be apparent that one of the side members may be adjusted independently of the other, that lateral adjustments may be made at either the top or the bottom of the collar, one independenly of the other, and that the whole collar is so constructed that the necessary adjustments may be quickly and efficiently made without a multiplicity of tools, and without undue loss of time. By constructing a collar in accordance with the invention herein described, a multiplicity of adjustments may be made to fit almost any form of horse within the adjustment limits, it being understood, of course, that the collars will generally be made of three sizes, for light, medium and heavy horses, and that a collar for any one of these classes can be adjusted to fit almost any horse within its class.

From the foregoing, it will be apparent that we have provided an efficient, durable and inexpensive collar adapted to be easily adjusted, and one calculated to serve the purpose for which it is intended.

We claim:—

1. A horse collar comprising side members, adjustable extensions carried by the upper ends of said side members, overlapping fastening plates hinged to the extensions, a back-strap holder and check rein hook carried by the plates, a metallic pad between the two members and means for connecting the pad to the back-strap holder and the check rein hook, whereby the pad is supported, and means for fastening the lower ends of the side members together.

2. A horse collar comprising side members, plates hinged to the upper ends of said side members and overlapping one another, said plates having alining longitudinal slots, upstanding supports at the front and back of the collar and having overlapping lateral extensions upon the plates, a bolt passing through the slots in the plates and through the supports, a pad and fastening devices passing through the pad and through the upstanding supports, and means for fastening the lower end of the collar.

The foregoing specification signed at Fitchburg, Massachusetts, this twenty-fourth day of January, 1917.

JOHN N. JAMNBACK.
SAMUEL SAARI.